(12) United States Patent
Imai

(10) Patent No.: US 6,448,790 B1
(45) Date of Patent: Sep. 10, 2002

(54) ELECTROSTATIC CAPACITANCE DETECTING DEVICE

(75) Inventor: Toshio Imai, Iruma (JP)

(73) Assignee: Citizen Watch Co., Ltd., Tokyo (JP)

( * ) Notice: Subject to any disclaimer, the term of this patent is extended or adjusted under 35 U.S.C. 154(b) by 37 days.

(21) Appl. No.: 09/695,426

(22) Filed: Oct. 25, 2000

(30) Foreign Application Priority Data

Oct. 26, 1999 (JP) .......................................... 11-303872
Feb. 23, 2000 (JP) ....................................... 2000-045305

(51) Int. Cl.[7] ............................................ G01R 27/26
(52) U.S. Cl. ........................ 324/661; 324/662; 324/671
(58) Field of Search ................................ 324/661, 662, 324/663, 671, 686, 519; 361/283.1; 382/124, 115

(56) References Cited

U.S. PATENT DOCUMENTS 5,325,442 A * 6/1994 Knapp ........................ 382/124
5,978,496 A * 11/1999 Harkin ........................ 324/663
6,114,862 A * 9/2000 Tartagni ...................... 324/662

FOREIGN PATENT DOCUMENTS

JP 08-305832 11/1996
JP 11-019070 1/1999

* cited by examiner

*Primary Examiner*—Christine K. Oda
(74) *Attorney, Agent, or Firm*—Armstrong, Westerman & Hattori, LLP

(57) ABSTRACT

Bias charge is injected from a bias power supply line 3 into a detecting electrode 11 constituting an electrostatic capacitance element between an object to be detected to accumulate charge in accordance with its electrostatic capacitance, and when the charge is distributed between the electrostatic capacitance element and a capacitance element 12 which has been reset to a reset potential, a holding voltage of the capacitance element 12 changes in accordance with the amount of charges accumulated in the detecting electrode 11, and thus a signal is outputted regarding the change in holding voltage as an amount of change in gate potential of a source follower amplifier element 13, thereby detecting the capacitance of the electrostatic capacitance element between the object to be detected and the detecting electrode 11.

18 Claims, 10 Drawing Sheets

BIAS POTENTIAL Vb

RESET POTENTIAL Vr

SIGNAL

RESET POTENTIAL Vr

BIAS POTENTIAL Vb

RESET POTENTIAL Vr

SIGNAL

ELECTROSTATIC CAPACITANCE DETECTING DEVICE

BACKGROUND OF THE INVENTION

1. Field of the Invention

The present invention relates to a device for detecting an electrostatic capacitance formed by an object to be detected and a detecting electrode and, more specifically, to an electrostatic capacitance detecting device usable to electrically obtain a fingerprint pattern by detecting difference in electrostatic capacitance due to projections and depressions of a fingerprint independent of initially charged condition of a finger that is an object to be detected.

2. Description of the Related Art

With development of the information society, individual identification by fingerprint collation is an easy and reliable security check means for prevention of unauthorized log-in into networks, identification in electronic commerce, identification in various administrative systems, prevention of use of credit cards and the like by unauthorized people.

FIG. 10 is a basic configuration diagram of a fingerprint input device which has been conventionally widely used.

In this device, a light emitting diode (LED) 71 emits light to a prism 72 with which a finger 70 is in contact. The light is reflected on a reflection surface, with which the finger is in contact, of the prism 72 to deflect by 90° toward a lens 73. Then, the lens 73 gathers light signals containing the information of projections and depressions of a fingerprint of the finger 70 to form a picture image on a light-receptive surface of a CCD (Charge Coupled Device) 74 which is an image pickup device. The CCD 74 converts distribution of light strength of the formed image into electrical signals. This makes it possible to obtain electrical fingerprint information.

The conventional fingerprint input device as described above, however, is large in volume and weight, and, further, is costly.

With development of the information society, terminal devices, like cellular phones which can get access while moving have also appeared as devices located at the ends of the networks, and thus problems concerning security checks for the networks have been becoming more serious.

However, it is difficult to mount the above-described conventional fingerprint input device to a portable terminal device for the security check.

More specifically, the conventional fingerprint input device shown in FIG. 10 needs a comparatively large prism and lens to optically catch an image of a fingerprint, and they and a light source need to be arranged three-dimensionally, naturally resulting in a large and heavy fingerprint input device.

Further, the conventional fingerprint input device is costly because it requires many assembly tasks, such as precise optical alignment, which need advanced techniques, and it has a high parts count.

Furthermore, driving the CCD, which is an image pickup device, generally requires three power sources and power consumption of several hundred milliwatts. Moreover, the conventional fingerprint input device requires electric power for causing the LED to emit light, and thus it is difficult to use the above device in a portable device driven by a battery.

Thus, for example, a flat-shaped fingerprint input device by an electrostatic capacitance detection method is supposed as viewed in Japan Patent Laid-open No. 8-305832. This device is constituted by arranging many detecting electrodes and switch elements on a substrate in two dimensions and connecting them to an electrostatic capacitance detecting circuit and a driving circuit with Y wirings and X wirings.

When a finger is put on the device to detect an electrostatic capacitance between the device and the finger, one Y wiring is first turned OFF to pre-charge a parasitic capacitance of the X wiring to a potential. Next, the Y wiring is turned ON to distribute the charges between the electrostatic capacitance formed between the finger and the detecting electrode, and the aforesaid parasitic capacitance, thereby detecting the electrostatic capacitance between the finger and the device by change in potential of the X wiring at this time. Then, detection of electrostatic detecting capacitances between many detecting electrodes and the finger enables input of the information of the fingerprint.

In the conventional device as described above, however, the change in potential of the X wiring at the time of charge distribution by the electrostatic capacitance between the finger and the detecting electrode, and the parasitic capacitance depends on initially charged condition of the finger. The finger varies in charged condition, making it difficult to detect the accurate electrostatic capacitance.

Further, charges need to be injected into the X wiring and the parasitic capacitance for readout so as to pre-charge for every detection of the electrostatic capacitance, and thus there are problems that the detection speed is low and that the movement the finger during the detection makes it impossible to input an accurate electrostatic capacitance distribution in accordance with the fingerprint.

Therefore, a suggestion for solving such problems in the finger print input device by the electrostatic capacitance detection method is made in Japan Patent Laid-open No. 11-19070. More specifically, electrodes formed in a mesh or in a comb are provided around many detecting electrodes, and a radio frequency is applied to the electrodes by a radio frequency generator to emit a radio frequency toward a finger. This enables detection of the accurate electrostatic capacitance without being affected by the charged condition of the finger.

However, the provision of the electrodes formed in a mesh or in a comb and the necessity of the high frequency generator results in high cost and in disadvantage for making the device smaller and thinner. Further, there is a problem that it is difficult to speed up readout and detection of the electrostatic capacitance as in the above-described conventional example.

SUMMARY OF THE INVENTION

The present invention is carried out to solve the above problems, and its object is to provide an electrostatic capacitance detecting device which is small-sized, thin, lightweight with low power consumption, and additionally is capable of being fabricated at a low cost, and, more specifically, to provide an electrostatic capacitance detecting device capable of electrically obtaining a fingerprint pattern at a high speed without being affected by an initial potential of an object to be detected, and mountable on a portable device.

To achieve the above-described object, the present invention provides an electrostatic capacitance detecting device configured as follows.

On a semiconductor substrate, a detecting electrode constituting an electrostatic capacitance element by being brought into contact with or put close to an object to be detected through a protection film; a bias switch element for injecting bias charges into the detecting electrode; a charge transfer switch element for transferring signal charges accumulated in the detecting electrode in response to a timing signal for signal detection; a capacitance element for converting the signal charges transferred thereto via the charge transfer switch element into a voltage signal; a source follower amplifier element for receiving and amplifying a holding voltage of the capacitance element, a readout selection switch element provided on a source side of the source follower amplifier element; and a reset switch element providing the capacitance element with a reset potential, are provided.

Further, it is possible to constitute an electrostatic capacitance detecting device comprising a detecting area constituted by arranging two-dimensionally a plurality of the electrostatic capacitance detecting devices each of which is formed by the above-described configuration as an individual detecting cell, readout row selection means for selecting a readout row, and readout column selection means for selecting a readout column in the detecting area.

In this case, it is preferable that the readout row selection means is a first shift register for controlling the readout selection switch element of each detecting cell for each readout row, and that the readout column selection means is composed of vertical signal lines for sending-out output signals from the readout selection switch elements of the detecting cells together for each readout column, a single detection signal output line, column selection switch elements provided between the vertical signal lines and the single detection signal output line respectively, and a second shift register for controlling the column selection switch elements.

It is preferable that each of the bias switch element, the charge transfer switch element, the reset switch element, the source follower amplifier element, and the readout selection switch element is composed of a MOS transistor.

Furthermore, the reset switch elements, the reset power supply line, and the reset gate control line in the above-described electrostatic capacitance detecting device can be omitted. Alternatively, the bias switch elements, the bias power supply line, and the bias gate control line may be omitted.

In the electrostatic capacitance detecting device according to the invention, the object to be detected and the detecting electrode constitute the electrostatic capacitance element in accordance with projections and depressions of the object to be detected, charges are injected into the electrostatic capacitance element to thereby detect its signal by a detection circuit provided in each detecting cell, and the signal is amplified by the source follower amplifier element to be outputted.

In this event, the detecting electrode forming the electrostatic capacitance element with the object to be detected holds a prescribed potential before the detection of the signal, enabling the detection of accurate capacitance without being affected by the initially charged condition of the object to be detected.

Even in the configuration in which a plurality of the detecting cells are arranged two-dimensionally to constitute the detecting area, charges are injected into each electrostatic capacitance element in accordance with projections and depressions of the object to be detected and the signal is detected in each unit cell, thereby making it possible to operate the electrostatic capacitance detecting device at a speed higher than a conventional one which detects a signal by injecting charges into wiring for readout and its parasitic capacitance. Further, the power consumption is also low.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of an electrostatic capacitance detecting device according to the invention will be described with reference to the drawings.

First Embodiment

FIG. 1 to FIG. 3

A first embodiment of the electrostatic capacitance detecting device according to the invention will be explained first with FIG. 1 to FIG. 3.

Figure 1:
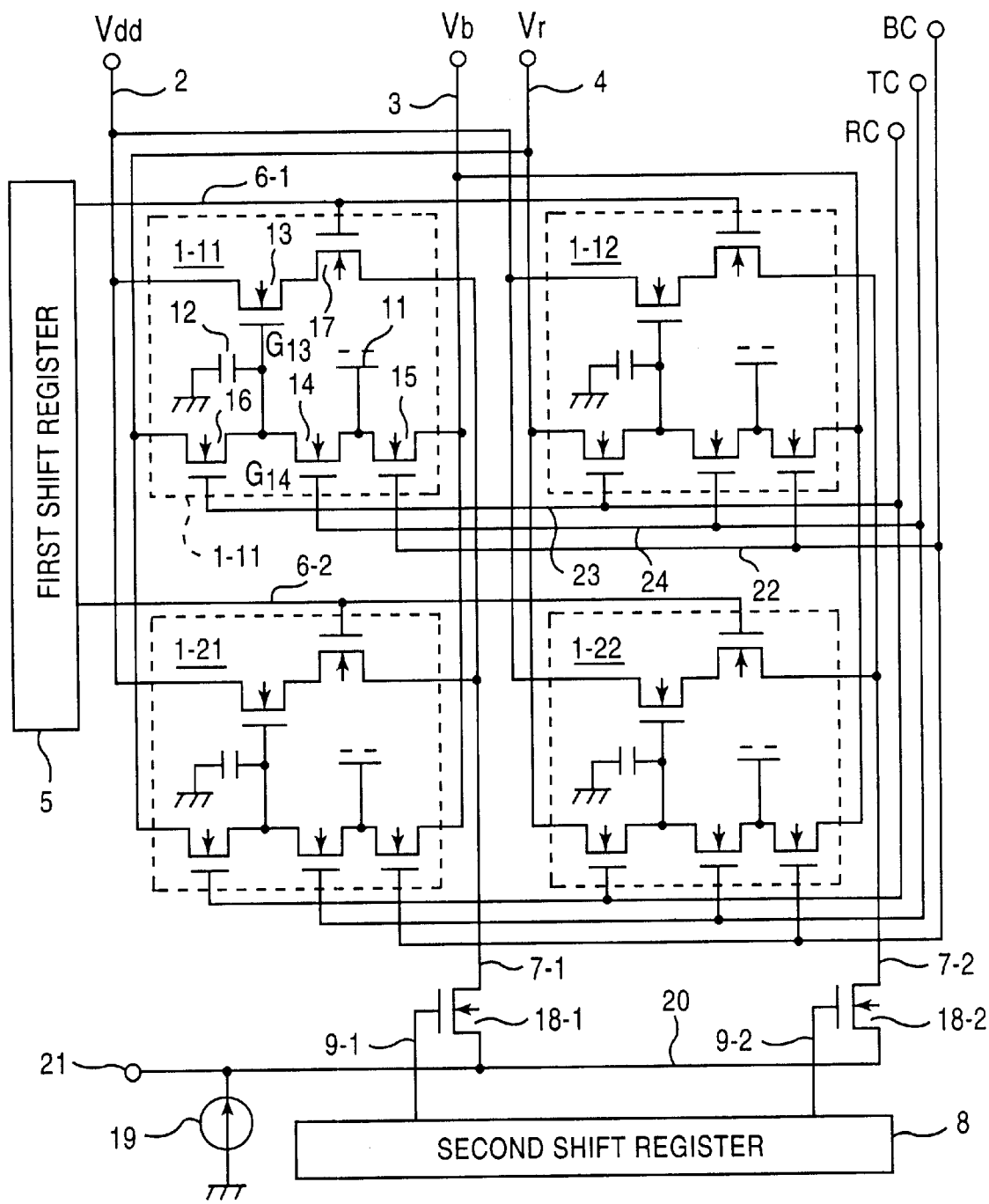
FIG. 1, circuit diagram showing a configuration of a first embodiment of an electrostatic capacitance detecting device according to the invention.

FIG. 1 is a circuit diagram showing a configuration of the electrostatic capacitance detecting device.

In FIG. 1, numeral 1-11 denotes a detecting cell in a first row and a first column, numeral 1-12 denotes a detecting cell in the first row and a second column, numeral 1-21 denotes a detecting cell in a second row and the first column, and numeral 1-22 denotes a detecting cell in the second row and the second column, thereby showing a case, as an example, where detecting cells are arranged in two rows and two columns for convenience in explanation, but actually, more detecting cells are arranged two-dimensionally to form a detecting area. Incidentally, each detecting cell also constitutes one electrostatic capacitance detecting device according to the invention, and when it is unnecessary particularly to distinguish its arranged location, the cell is referred to as a detecting cell 1.

Each detecting cell 1 is composed of a detecting electrode 11, a bias switch element 15, a capacitance element 12, a charge transfer switch element 14, a source follower amplifier element 13, a reset switch element 16, and a readout selection switch element 17.

The detecting electrode 11 constitutes an electrostatic capacitance element by being brought into contact with or put close to an object to be detected such as a finger through a protection film not shown. The bias switch element 15 is a switch element for injecting charges by a bias potential Vb into the detecting electrode 11 from a bias power supply line 3.

The capacitance element 12 is an element for converting signal charges accumulated in the detecting electrode 11 into a voltage signal. The charge transfer switch element 14 is a switch element for transferring the signal charges accumulated in the detecting electrode 11 to the capacitance element 12.

The source follower amplifier element 13 is an amplifier element which is supplied with a holding voltage of the capacitance element 12 at its gate and amplifies the holding voltage and outputs it from its source. The reset switch element 16 is a switch element for providing the capacitance element 12 with a reset potential Vr from a reset power supply line 4.

The readout selection switch element 17 is a switch element connected to a source side of the source follower amplifier element 13 for controlling readout of a detection voltage amplified by the source follower amplifier element 13.

In FIG. 1, only the aforesaid electrode and components constituting the detecting cell 1-11 are given reference numerals, but other detecting cells 1-12, 1-21, and 1-22 have the same configuration, and thus the numerals thereof are omitted.

The detecting electrodes 11 and components 12 to 17 constituting the detecting cells 1 are all provided on a semiconductor substrate, and the top of them are covered with the protection film. Each detecting electrode 11 constitutes the electrostatic capacitance element by being brought into contact with or put close to the object to be detected such as a finger through the protection film.

Further, each of the source follower amplifier element 13, the charge transfer switch element 14, the bias switch element 15, the reset switch element 16, and the readout selection switch element 17 is composed of an n-channel MOS transistor (FET).

Drain terminals of the source follower amplifier elements 13 of the detecting cells 1 are commonly connected to a power supply line 2, so that a supply voltage Vdd is applied thereto.

Gates of the charge transfer switch elements 14 of the detecting cells 1 are commonly connected to a transfer gate control line 24, so that all the detecting cells 1 are collectively controlled by a transfer gate control signal TC.

Further, gates of the reset switch elements 16 of the detecting cells 1 are commonly connected to a reset gate control line 23, so that all the detecting cells 1 are collectively controlled by a reset gate control signal RC.

Furthermore, gates of the bias switch elements 15 of the detecting cells 1 are commonly connected to a bias gate control line 22, so that all the detecting cells 1 are collectively controlled by a bias gate control signal BC.

On the other hand, gates of the readout selection switch elements 17 of the detecting cells 1-11 and 1-12 are commonly connected to a horizontal address line 6-1 of a first shift register 5, whereby the detecting cells 1-11 and 1-12 in the first row are simultaneously controlled, and gates of the readout selection switch elements 17 of the detecting cells 1-21 and 1-22 are commonly connected to a horizontal address line 6-2 of the first shift register 5, whereby the detecting cells 1-21 and 1-22 in the second row are simultaneously controlled.

The readout selection switch elements 17 of the detecting cells 1 are selected in sequence in each row by an address pulse outputted from the first shift register 5 to the horizontal address lines 6-1 and 6-2. The first shift register 5 is a readout row selection means.

The selected readout selection switch elements 17 of the detecting cells 1 are conducted, whereby the sources of the source follower amplifier elements 13 thereof are connected to vertical signal lines 7-1 and 7-2 respectively via the readout selection switch elements 17. More specifically, the sources of the source follower amplifier elements 13 of the detecting cells 1-11 and 1-21 in the first column are connected to the vertical signal line 7-1, and the sources of the source follower amplifier elements 13 of the detecting cells 1-21 and 1-22 in the second column are connected to the vertical signal line 7-2 respectively.

The vertical signal lines 7-1 and 7-2 are commonly connected to a single detection signal output line 20 via column selection switch elements 18-1 and 18-2 respectively. The detection signal output line 20 is grounded via a constant current load 19 and connected to a signal output terminal 21.

Further, gates of the column selection switch elements 18-1 and 18-2 are connected to vertical address lines 9-1 and 9-2 of a second shift register 8 respectively. The column selection switch elements 18-1 and 18-2 are selected in sequence by an address signal outputted from the second shift register 8 to the vertical address lines 9-1 and 9-2, thereby outputting detection signals by the detecting cells 1 to the detection signal output line 20.

The vertical signal lines 7-1 and 7-2, the detection signal output line 20, the column selection switch elements 18-1 and 18-2, the second shift register 8, and the like constitute a readout column selection means. Incidentally, each of the column selection switch elements 18-1 and 18-2 is also composed of an n-channel MOS transistor.

The electrostatic capacitance detecting operation by the electrostatic capacitance detecting device of the first embodiment will be explained using FIG. 2A to FIG. 2C, and also FIG. 3.

Figure 2A:
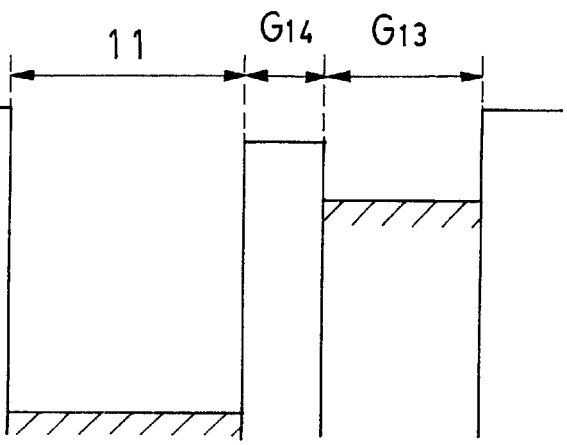
FIG. 2A, FIG. 2B, and FIG. 2C are views for explaining electrostatic capacitance detecting operation by each detecting cell of the electrostatic capacitance detecting device shown in FIG. 1.
Figure 2B:
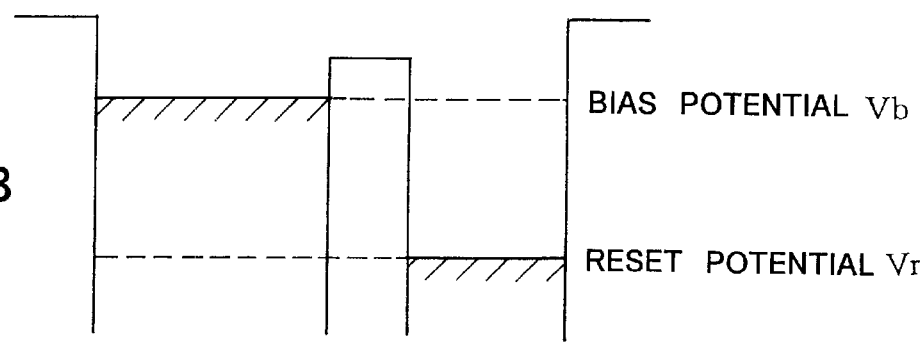
Figure 2C:
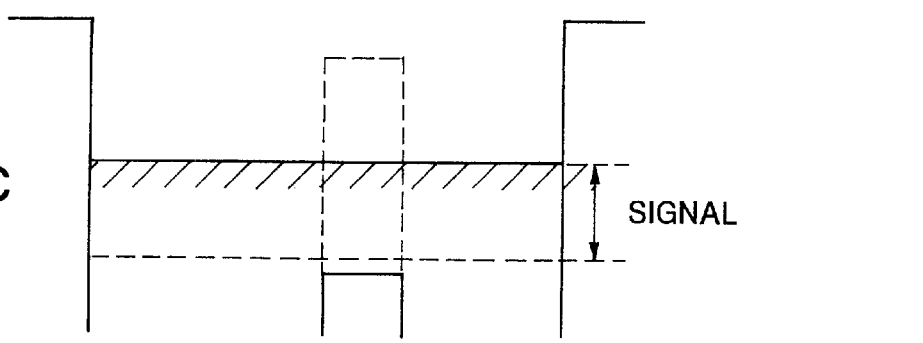

The operation of the detecting cell 1 in FIG. 1 detecting an electrostatic capacitance is shown in FIG. 2A to FIG. 2C. These are potential distribution diagrams of the detecting electrode 11, the gate $G_{14}$ of the charge transfer switch element 14, and the gate $G_{13}$ of the source follower amplifier element 13 to which the capacitance element 12 is connected, in the detecting cell 1 in FIG. 1.

FIG. 2A shows a state immediately after the object to be detected contacts the top of the detecting electrode 11 through the protection film, with the bias switch element 15, the charge transfer switch element 14, and the reset switch element 16 being OFF, and since the detecting electrode 11 is not connected to the charge supply source, its potential is determined in accordance with the charged condition of the object to be detected.

Subsequently, the bias switch element 15 is turned ON, thereby injecting bias charges to the detecting electrode 11 from the bias power supply line 3. Then, the potential of the detecting electrode 11 which has been determined in accordance with the charged condition of the object to be detected is set to the bias potential Vb as shown in FIG. 2B. Further, in the electrostatic capacitance element formed by the object to be detected and the detecting electrode 11, the amount of charges accumulated is in accordance with its capacitance.

Then, the reset switch element 16 is turned ON, thereby resetting the amount of charges to bring the holding voltage of the capacitance element 12 connected to the gate of the source follower amplifier element 13 to the reset potential Vr.

Subsequently, the bias switch element 15 and the reset switch element 16 are turned OFF and the charge transfer switch element 14 is turned ON, thereby distributing the charges between the electrostatic capacitance element formed by the object to be detected and the detecting electrode 11, and the capacitance element 12 connected to the gate of the source follower amplifier element 13.

In this event, as shown in FIG. 2C, the holding voltage of the capacitance element 12 changes in accordance with the amount of charges accumulated in the detecting electrode 11, and thus a signal is outputted regarding the change in holding voltage as an amount of change in potential of the gate $G_{13}$ of the source follower amplifier element 13, thereby obtaining the capacitance of the electrostatic capacitance element formed by the object to be detected and the detecting electrode 11.

The electrostatic capacitance detecting operations in the detecting cells 1-11, 1-12, 1-21, and 1-22 constituting the detecting area are as described above, and they are the same.

Next, the readout operation of the electrostatic capacitance detection signal by each detecting cell 1 will be explained with a timing chart in FIG. 3.

The detection is started from a state in which a finger which is the object to be detected contacts the detecting area including the detecting cells 1-11, 1-12, 1-21, and 1-22 of the electrostatic capacitance detecting device shown in FIG. 1.

First, the potential of the bias gate control signal BC is brought to a high level, the bias switch elements 15 of all the detecting cells 1 are turned ON, and bias charges in accordance with an electrostatic capacitance, which is formed between each detecting electrode 11 and the object to be detected, is injected to the detecting electrode 11 from the bias power supply line 3, thereby setting each detecting electrode 11 to the bias potential Vb as shown in FIG. 2B.

Figure 3:
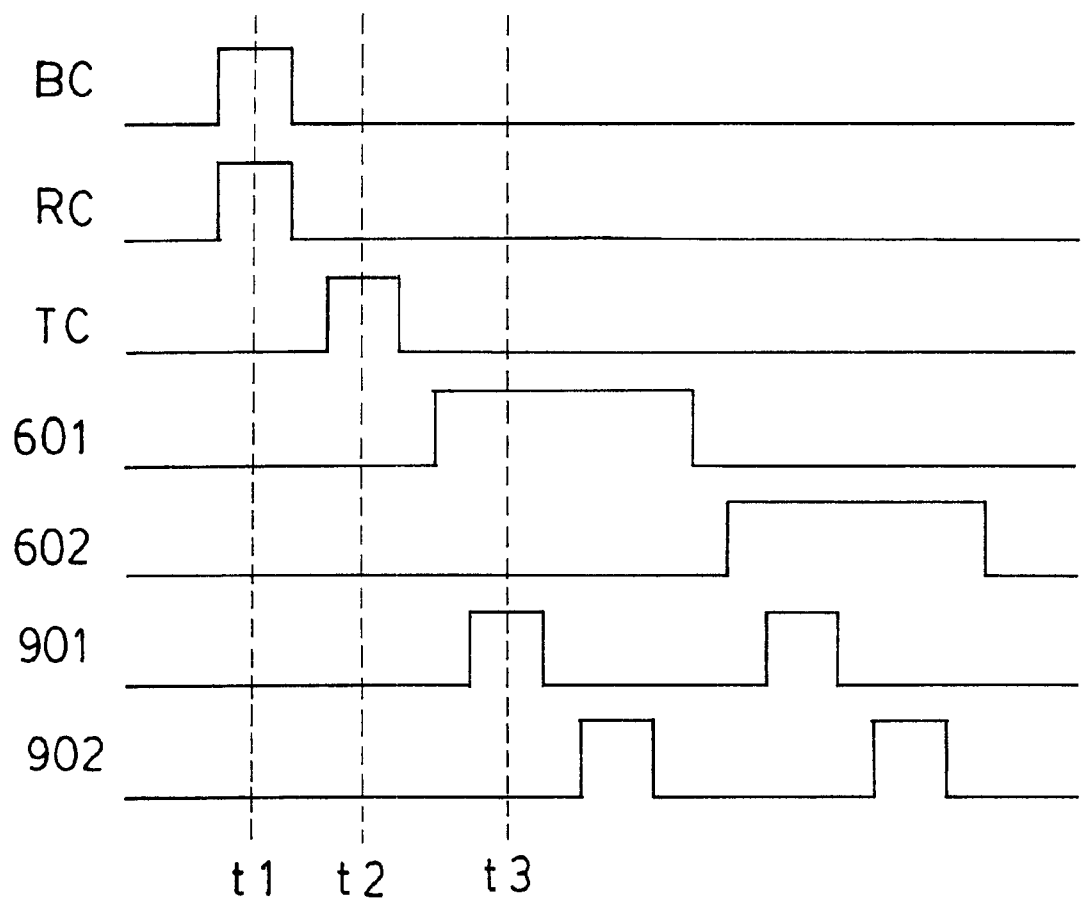
FIG. 3 is timing chart for explaining operation of the electrostatic capacitance detecting device by the same entire electrostatic capacitance detecting device shown in FIG. 1.

At this time, also the potential of the reset gate control signal RC is simultaneously brought to a high level, thereby resetting the amount of charges to bring the holding voltages of the capacitance elements 12 connected to the gates of the source follower amplifier elements 13 of all the detecting cells 1 to the reset potential Vr (the point of time t1 in FIG. 3).

Next, the potential of the transfer gate control signal TC is brought to a high level, and the charge transfer switch elements 14 of all the detecting cells 1 are turned ON. This distributes the charges between the electrostatic capacity element formed by the object to be detected and the detecting electrode 11, and the capacitance element 12 connected to the gate of the source follower amplifier element 13 in each detecting cell 1.

In this event, the amounts of charges accumulated in the detecting electrodes 11 are each different among the detecting cells 1-11, 1-12, 1-21, and 1-22 in accordance with projections and depressions of the object to be detected, and the holding voltages of the capacitance elements 12 are also each different among the detecting cells 1-11, 1-12, 1-21, and 1-22.

The holding voltage is applied to the gate of the source follower amplifier element 13 as shown in FIG. 2C. In other words, the amount of charges accumulated in the electrostatic capacitance formed by the object to be detected and the detecting electrode 11 has been converted into a voltage signal (the point of time t2 in FIG. 3).

Subsequently, the detection signal is read out. An address pulse 601 (shown in FIG. 3) which brings the horizontal address line 6-1 to a high level is applied first from the first shift register 5 shown in FIG. 1 which is the readout row selection means.

This turns the readout selection switch elements 17 of the detecting cells 1-11 and 1-12 in the first row ON, thereby connecting the sources of the source follower amplifier elements 13 of the detecting cells 1-11 and 1-12 to the vertical signal lines 7-1 and 7-2 respectively via the readout selection switch elements 17.

In this state, an address pulse 901 (shown in FIG. 3), which brings the vertical signal line 9-1 to a high level, is applied from the second shift register 8 which is the readout column selection means shown in FIG. 1, thereby turning the column selection switch element 18-1 ON. Consequently, a source follower circuit is constituted by the source follower amplifier element 13 of the detecting cell 1-11 and the constant current load 19.

Thereby, the gate voltage of the source follower amplifier element 13 of the detecting cell 1-11, that is, a voltage in accordance with the amount of charges accumulated in the electrostatic capacitance element formed by the object to be detected and the detecting electrode 11, appears on the output line 20 (the point of time t3 in FIG. 3). The voltage is outputted from the signal output terminal 21.

Subsequently, when an address pulse 902 shown in FIG. 3 is applied from the second shift register 8 to the vertical signal line 9-2, the column selection switch element 18-2 turns ON, whereby a source follower circuit is constituted by the source follower amplifier element 13 of the detecting cell 1-12 and the constant current load 19.

Thereby, the gate voltage of the source follower amplifier element 13, that is, a voltage in accordance with the amount of charges accumulated in the electrostatic capacitance element formed by the object to be detected and the detecting electrode 11 appears on the output line 20. The voltage is outputted from the signal output terminal 21.

As described above, the detection signals of one line produced by the detecting cells 1-11 and 1-12 in the first row can be read out in sequence into the detection signal output line 20 to be taken out in sequence from the signal output terminal 21.

Subsequently, an address pulse 602 shown in FIG. 3 is applied from the first shift register 5 to the horizontal address line 6-2, and then the address pulse 901 shown in FIG. 3 is applied to the vertical address line 9-1 and the address pulse 902 is applied to the vertical address line 9-2 in sequence from the second shift register 8 respectively. Thereby, as in the same manner as that of the above-described first row, the detection signals of one line produced by the detecting cells 1-21 and 1-22 in the second row can be read out in sequence into the detection signal output line 20 to be taken out in sequence from the signal output terminal 21.

As described above, the capacitance detection signals of the electrostatic capacitance elements which are formed by the object to be detected and the detecting electrodes 11, produced by all the detecting cells 1 arranged in two dimensions in the detecting area, can be read out.

In the aforesaid embodiment, the case of two rows and two columns has been taken as an example for explanation, but the signals can be similarly read out even in an arrangement with more rows and columns.

Figure 4:
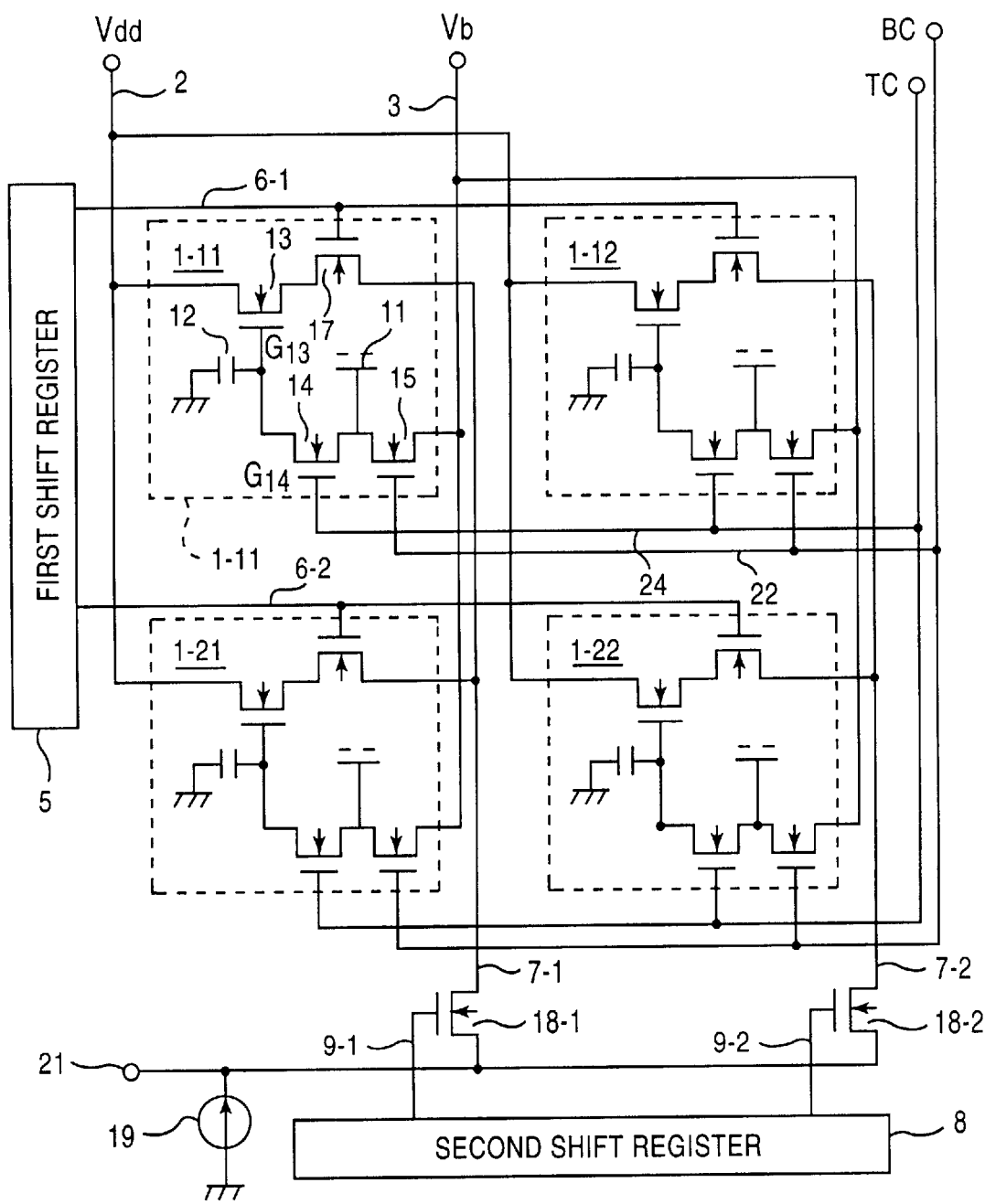
FIG. 4 circuit diagram showing a configuration of a second embodiment of the electrostatic capacitance detecting device according to the present invention.
Figure 5A:
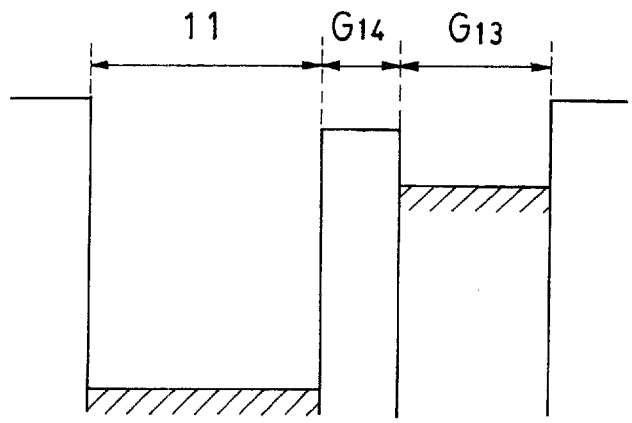
FIG. 5A, FIG. 5B, FIG. 5C, and FIG. 5D are views for explaining electrostatic capacitance detecting operation by each detecting cell of the electrostatic capacitance detecting device shown in FIG. 4.
Figure 5B:
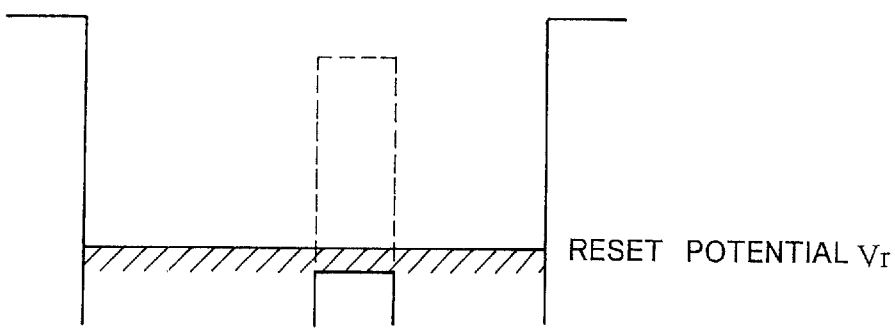
Figure 5C:
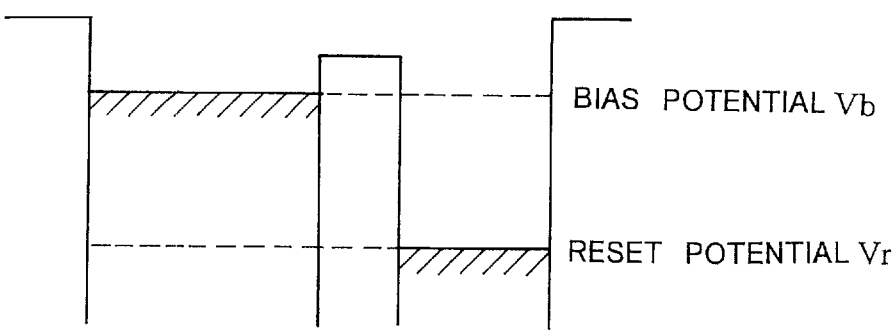
Figure 5D:
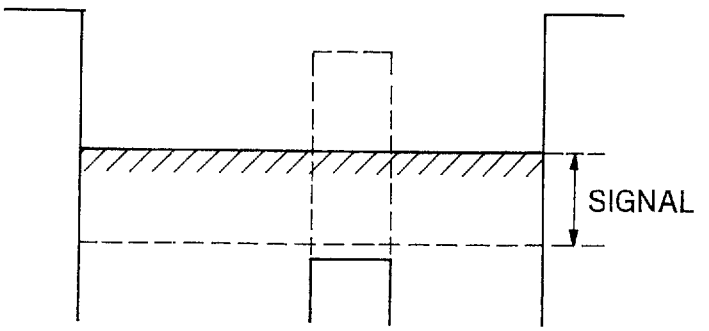
Figure 6:
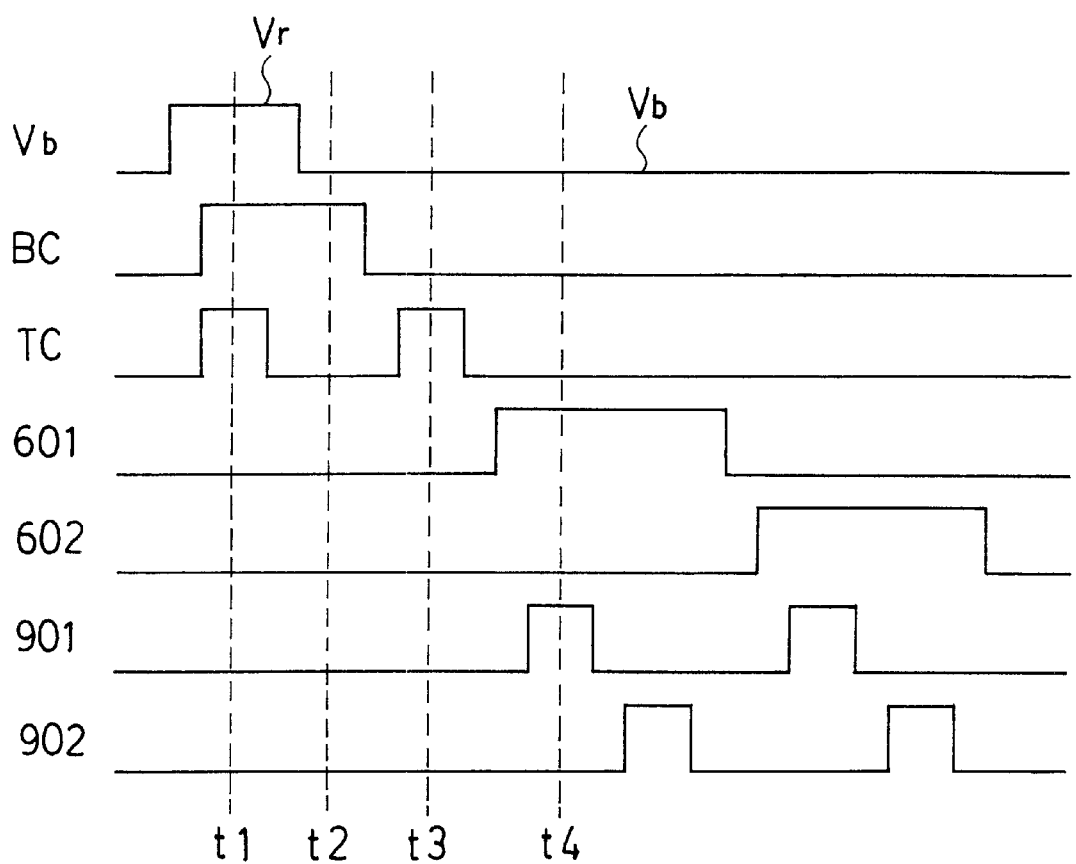
FIG. 6, is a timing chart for explaining operation of the electrostatic capacitance detecting device by the same entire electrostatic capacitance detecting device shown in FIG. 4.

Second Embodiment
FIG. 4 to FIG. 6

Next, the second embodiment of the electrostatic capacitance detecting device according to the invention will be explained with FIG. 4 to FIG. 6.

FIG. 4 is a circuit diagram showing a configuration of the electrostatic capacitance detecting device. In FIG. 4, the same numerals and symbols are given to portions which are the same as those in FIG. 1, and thus the description thereof is omitted.

The electrostatic capacitance detecting device of the second embodiment is one made by omitting the reset switch element 16 in each detecting cell 1 and removing the reset power supply line 4 and the reset gate control line 23 from the electrostatic capacitance detecting device of the first embodiment shown in FIG. 1, and the remaining configuration is the same as that of the electrostatic capacitance detecting device of the first embodiment.

The operation of the electrostatic capacitance detecting device of the second embodiment will be explained next.

The operation of each detecting cell 1 in FIG. 4 detecting an electrostatic capacitance will be explained first with FIG. 5A to FIG. 5D. These are potential distribution diagrams of a detecting electrode 11, a gate $G_{14}$ of a charge transfer switch element 14, and a gate $G_{13}$ of a source follower amplifier element 13 to which a capacitance element 12 is connected, in FIG. 4.

FIG. 5A shows a state immediately after an object to be detected contacts the top of the detecting electrode 11 through a protection film, with a bias switch element 15 and the charge transfer switch element 14 in FIG. 4 being OFF, and since the detecting electrode 11 is not connected to the charge supply source, its potential is determined in accordance with the charged condition of the object to be detected.

Subsequently, after the potential of the bias power supply line 3 is set to the reset voltage, the bias switch element 15 and the charge transfer switch element 14 are turned ON, thereby injecting charges from the bias power supply line 3 to bring the holding voltage of the capacitance element 12 connected to the gate $G_{13}$ of the source follower amplifier element 13 to the reset potential Vr as shown in FIG. 5B to thereby reset the amount of charges.

Thereafter, the charge transfer switch element 14 is turned OFF, and the potential of the bias power supply line 3 is set to the bias voltage Vb. This injects the bias charges from the bias power supply line 3 into the detecting electrode 11, whereby the detecting electrode 11 is set to the bias potential Vb as shown in FIG. 5C.

Consequently, the amount of charges accumulated is in accordance with the capacitance of the electrostatic capacitance element formed by the object to be detected and the detecting electrode 11.

Subsequently, the bias switch element 15 is turned OFF, and the charge transfer switch element 14 is turned ON. This distributes the charges between the electrostatic capacitance element formed by the object to be detected and the detecting electrode 11, and the capacitance element 12 which is connected to the gate $G_{13}$ of the source follower amplifier element 13. In this event, since the holding voltage of the capacitance element 12 changes in accordance with the amount of charges accumulated in the detecting electrode 11, a signal is outputted regarding the change in holding voltage as an amount of change in potential of the gate $G_{13}$ of the source follower amplifier element 13 shown in FIG. 5D, thereby obtaining the capacitance of the electrostatic capacitance element formed by the object to be detected and the detecting electrode 11.

Next, the readout operations of the detection signals produced by detecting cells 1-11, 1-12, 1-21, and 1-22 will be explained.

FIG. 6 shows a timing chart of the readout operation. The operation of detecting the electrostatic capacitance in each detecting cell 1 is the same as described above, and the detection is started from a state in which a finger which is the object to be detected contacts the top of each detecting electrode 11 through the protection film.

First, the potential of the bias power supply line 3 is set to the reset voltage Vr.

Then, the potentials of a bias gate control signal BC and a transfer gate control signal TC are brought to high levels, the bias switch elements 15 and the charge transfer switch elements 14 of the detecting cells 1-11, 1-12, 1-21, and 1-22 are turned ON, thereby resetting the amounts of charges to bring the holding voltages of the capacitance elements 12 connected to the gates of the source follower amplifier elements 13 of all the detecting cells 1 to the reset potential Vr (the point of time t1 in FIG. 6).

Further, after the potential of the transfer gate control signal TC is brought to a low level, the potential of the bias power supply line 3 is set to the bias voltage. This injects the bias charges from the bias power supply line 3 into the detecting electrode 11 in accordance with the electrostatic capacitance formed between the object to be detected and the detecting electrode 11, thereby setting the detecting electrode 11 to the bias potential Vb (the point of time t2 in FIG. 6).

Subsequently, the potential of the transfer gate control signal TC is brought to a high level, and the charge transfer switch elements 14 of the detecting cells 1 are turned ON. This distributes the charges between the electrostatic capacitance element formed by the objects to be detected and the detecting electrode 11, and the capacitance element 12 connected to the gate of the source follower amplifier element 13 in each detecting cell 1.

In this event, the amounts of charges accumulated in the detecting electrodes 11 are each different among the detecting cells 1-11, 1-12, 1-21, and 1-22 in accordance with projections and depressions of the object to be detected, and the holding voltages of the capacitance elements 12 are also each different among the detecting cells 1. The holding voltage is applied to the gate of the source follower amplifier element 13. In other words, the amount of charges accumulated in the electrostatic capacitance formed by the object to be detected and the detecting electrode 11 has been converted into a voltage signal (the point of time t3 in FIG. 6).

Subsequently, the detection signal produced by each detecting cell 1 is read out. The readout operation of a first shift register 5 outputting address pulses 601 and 602 in sequence and a second shift register 8 outputting address pulses 901 and 902 in sequence from here is the same as that in the first embodiment which has been explained with FIG. 3, and thus the explanation thereof is omitted.

In the aforesaid embodiment, the case of two rows and two columns has been taken as an example for explanation, but more detecting cells 1 are actually arranged in the detecting area.

Figure 7:
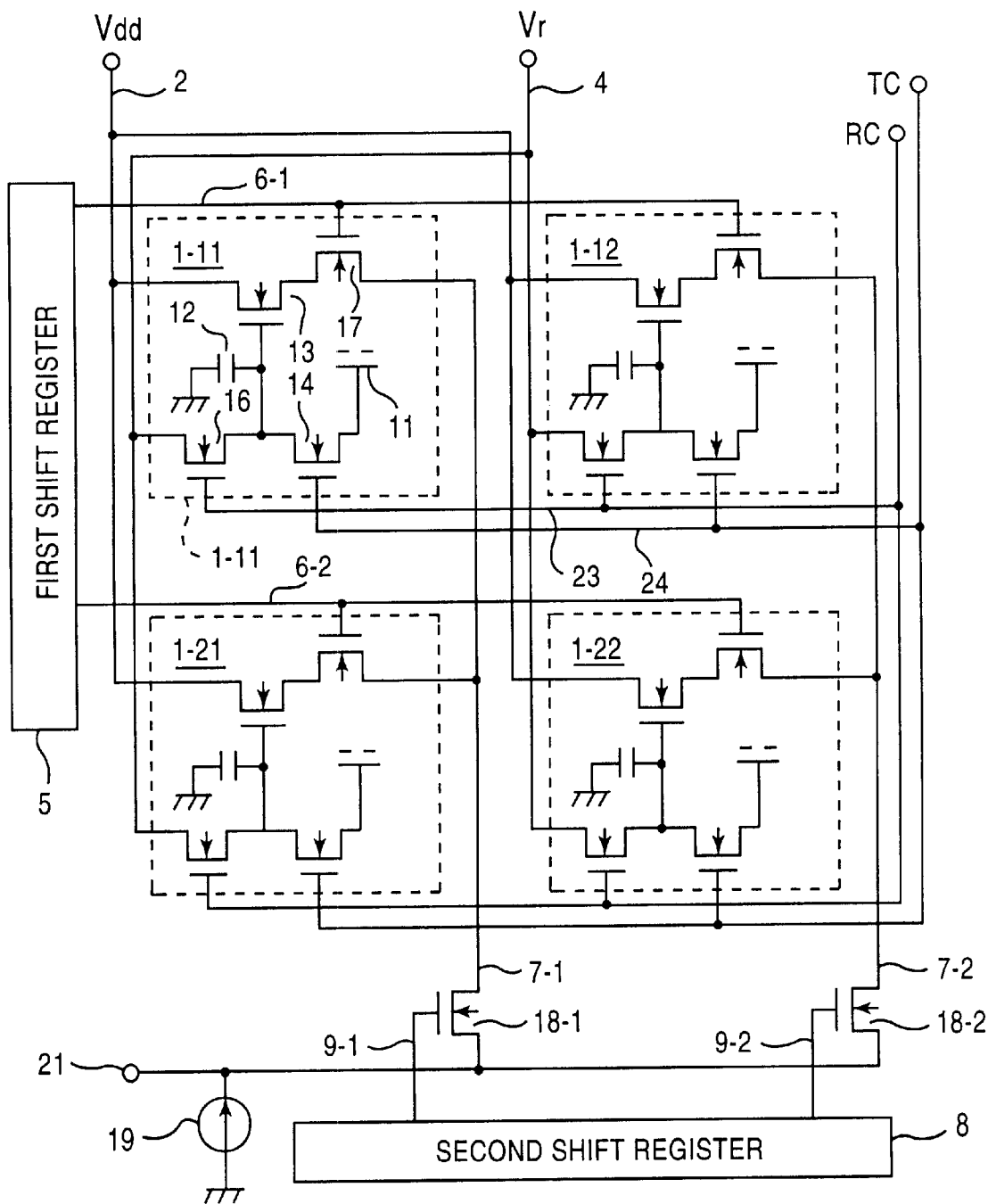
FIG. 7 is a circuit diagram showing a configuration of a third embodiment of the electrostatic capacitance detecting device according to the invention.
Figure 8:
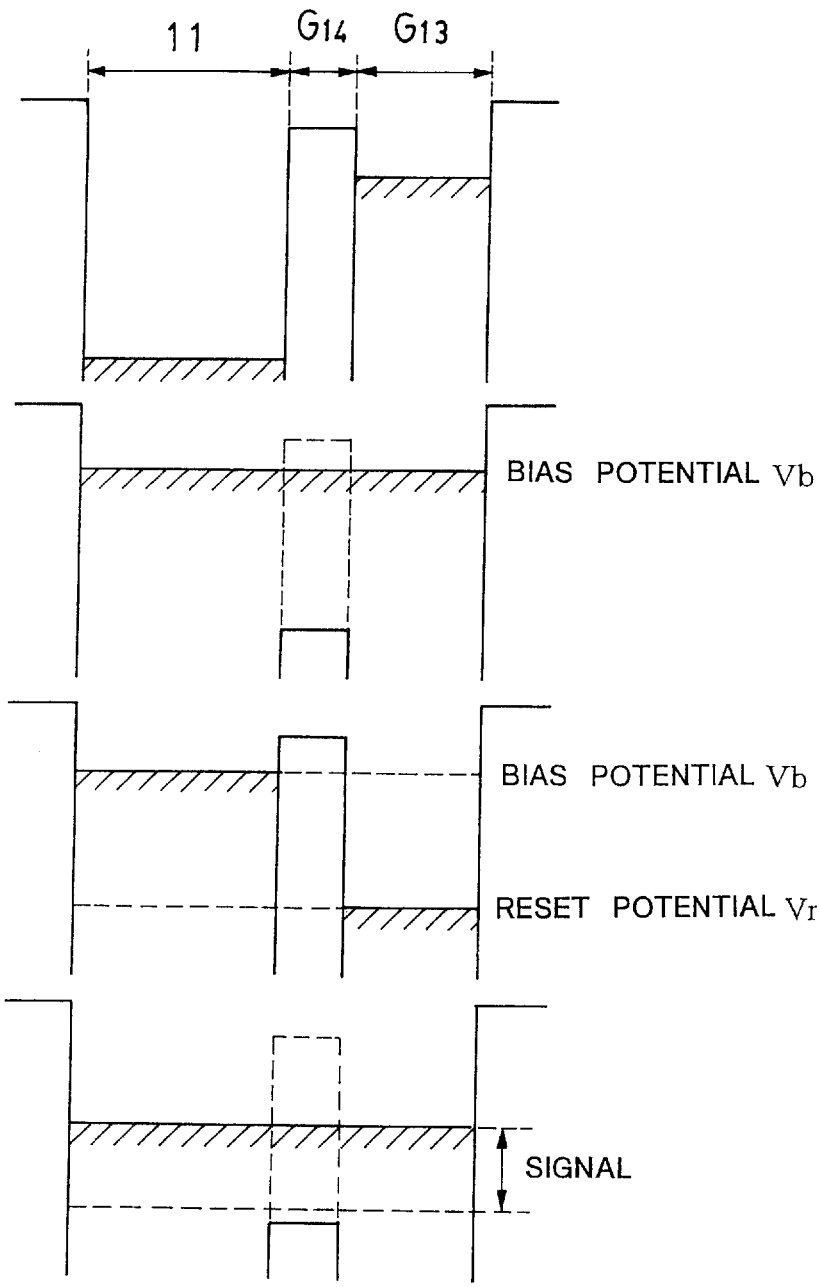
FIG. 8A, FIG. 8B, FIG.8C and FIG. 8D are views for explaining electrostat capacitance detecting operation by each detecting cell of the electrostatic capacitance detecting device shown in FIG. 7.
Figure 9:
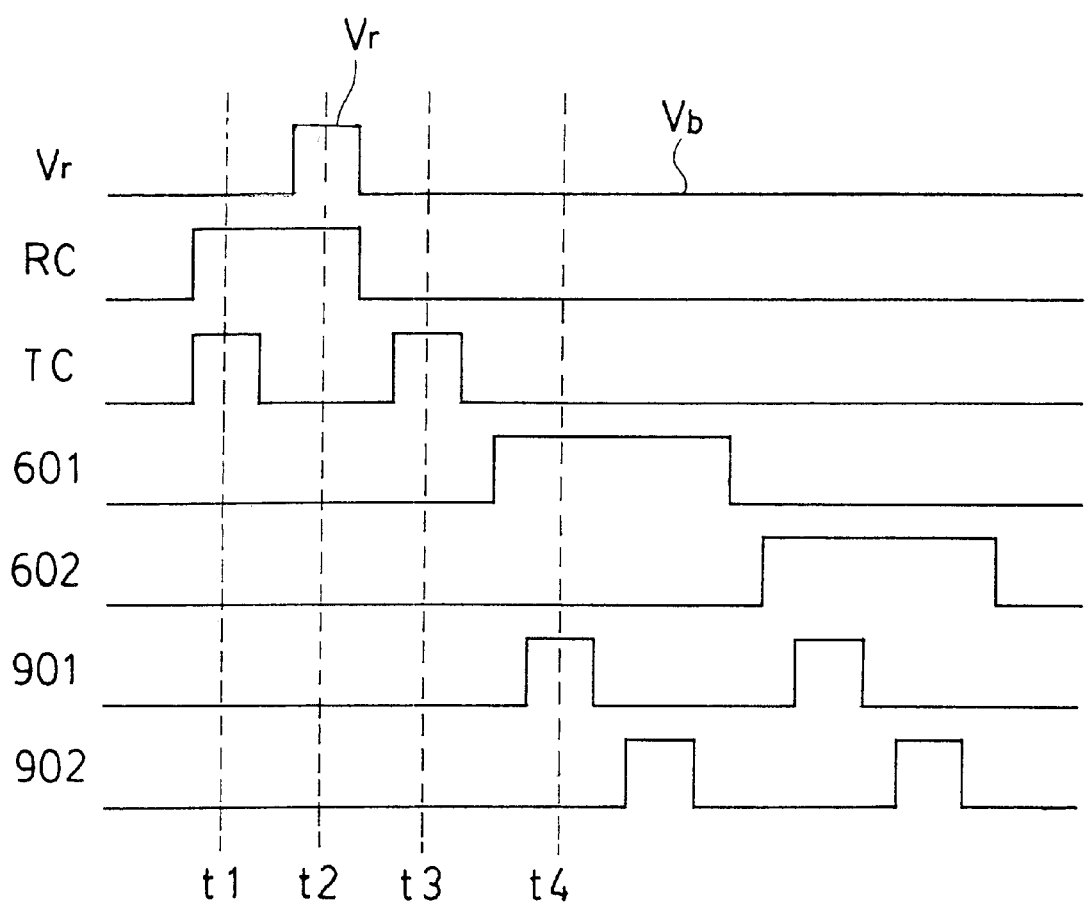
FIG.9 is a timing chart for explaining operation of the electrostatic capacitance detecting device by the same entire electrostatic capacitance detecting device shown in FIG. 7.
Figure 10:
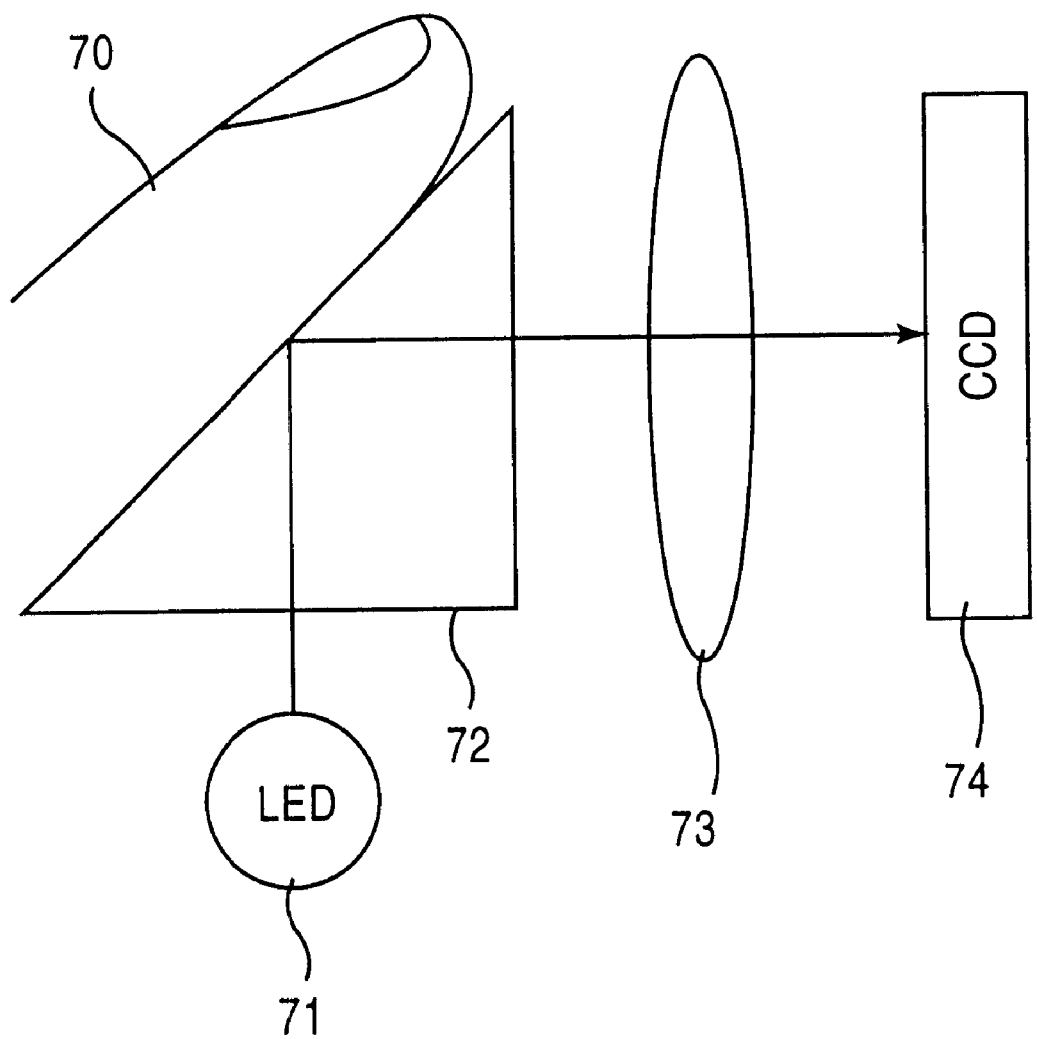
FIG. 10 is a view for explaining a configuration of a conventional fingerprint in put device.

Third Embodiment
FIG. 7 to FIG. 9

Next, the third embodiment of the electrostatic capacitance detecting device according to the present invention will be explained with FIG. 7 to FIG. 9.

FIG. 7 is a circuit diagram showing a configuration of the electrostatic capacitance detecting device. In FIG. 7, the same numerals and symbols are given to portions which are the same as those in FIG. 1, and thus the description thereof is omitted.

The electrostatic capacitance detecting device of the third embodiment is one made by omitting the bias switch element 15 in each detecting cell 1 and removing the bias power supply line 3 and the bias gate control line 22 from the electrostatic capacitance detecting device of the first embodiment shown in FIG. 1, and the remaining configuration is the same as that of the electrostatic capacitance detecting device of the first embodiment.

The operation of the electrostatic capacitance detecting device of the third embodiment will be explained next.

The operation of each detecting cell 1 in FIG. 7 detecting an electrostatic capacitance will be explained first with FIG. 8A to FIG. 8D. These are potential distribution diagrams of a detecting electrode 11, a gate $G_{14}$ of a charge transfer switch element 14, and a gate $G_{13}$ of a source follower amplifier element 13 to which a capacitance element 12 is connected, in FIG. 7.

FIG. 8A shows a state immediately after an object to be detected contacts the top of the detecting electrode 11 through a protection film, with a reset switch element 16 and the charge transfer switch element 14 being OFF, and since the detecting electrode 11 is not connected to the charge supply source, its potential is determined in accordance with the charged condition of the object to be detected.

Subsequently, after the potential of the reset power supply line 4 is set to the bias voltage Vb, the reset switch element 16 and the charge transfer switch element 14 are turned ON, thereby injecting bias charges from the reset power supply line 4 into the detecting electrode 11.

This sets the potential of the detecting electrode 11 which has been determined in accordance with the charged condition of the object to be detected to the bias potential Vb as shown in FIG. 8B.

Thereafter, the charge transfer switch element 14 is turned OFF to accumulate in the detecting electrode 11 the amount of charges in accordance with the capacitance of the electrostatic capacitance element formed by the object to be detected and the detecting electrode 11.

Further, the potential of the reset power supply line 4 is set to the reset voltage Vr to thereby reset the amount of charges to bring the holding voltage of the capacitance element 12 connected to the gate $G_{13}$ of the source follower amplifier element 13 to the reset potential Vr as shown in FIG. 8C.

Subsequently, the reset switch element 16 is turned OFF, and the charge transfer switch element 14 is turned ON. This distributes the charges between the electrostatic capacitance formed by the object to be detected and the detecting electrode 11, and the capacitance element 12 which is connected to the gate $G_{13}$ of the source follower amplifier element 13.

In this event, since the holding voltage of the capacitance element 12 changes in accordance with the amount of charges accumulated in the detecting electrode 11, a signal is outputted regarding the change in holding voltage as an amount of change in potential of the gate $G_{13}$ of the source follower amplifier element 13 shown in FIG. 8D, thereby obtaining the capacitance of the electrostatic capacitance element formed by the object to be detected and the detecting electrode 11.

Next, the readout operation of the electrostatic capacitance detection signals produced by the detecting cells which have been detected as described above will be explained using a timing chart in FIG. 9.

The electrostatic capacitance detecting operations in the detecting cells 1-11, 1-12, 1-21, and 1-22 arranged in a detecting area are the same as described above.

The detection is started from a state in which the object to be detected contacts the top of the detecting electrodes through the protection film.

First, the potential of the reset power supply line 4 is set to the bias voltage Vb. Then, the potentials of a reset gate control signal RC and a transfer gate control signal TC are set to high levels, and the reset switch elements 16 and the charge transfer switch elements 14 of the detecting cells 1 are turned ON, thereby injecting charges to bring the detecting electrodes 11 of all the detecting cells 1 to the bias potential Vb (the point of time t1 in FIG. 9).

Then, after the potential of the transfer gate control signal TC is brought to a low level, the potential of the reset power supply line 4 is set to the reset voltage Vr. This resets the holding voltages of the capacitance elements 12 connected to the gates $G_{13}$ of the source follower amplifier elements 13 of all the detecting cells 1 to the reset potential Vr.

On the other hand, the amount of charges accumulated in the detecting electrode 11 is in accordance with the electrostatic capacitance formed between the detecting electrode 11 and the object to be detected (the point of time t2 in FIG. 9).

Subsequently, the potential of the reset gate control signal RC is brought to a low level, and the reset switch element 16 is turned OFF. Further, the potential of the transfer gate control signal TC is brought to a high level, and the charge transfer switch element 14 of each detecting cell 1 is tuned ON.

This distributes the charges between the capacitance element 12 and the electrostatic capacitance formed by the object to be detected and the detecting electrode 11 in each detecting cell 1.

In this event, the amounts of charges accumulated in the detecting electrodes 11 are each different among the detecting cells 1-11, 1-12, 1-21, and 1-22 in accordance with projections and depressions of the object to be detected, and the holding voltages of the capacitance elements 12 are also each different among the detecting cells 1. The holding voltage is applied to the gate $G_{13}$ of the source follower amplifier element 13.

In other words, the amount of charges accumulated in the electrostatic capacitance element formed by the object to be detected and the detecting electrode 11 has been converted into a voltage signal (the point of time t3 in FIG. 9).

Subsequently, the detection signal produced by each detecting cell 1 is read out. The readout operation of a first shift register 5 outputting address pulses 601 and 602 in sequence and a second shift register 8 outputting address pulses 901 and 902 in sequence from here is the same as that in the first embodiment which has been explained with FIG. 3, and thus the explanation thereof is omitted.

In the aforesaid embodiment, the case of two rows and two columns has been taken as an example for explanation, but more detecting cells 1 are actually arranged in the detecting area.

However, even a single detecting cell 1 constitutes the electrostatic capacitance detecting device according to the present invention.

Further, in place of the first and second shift registers, decoders can be used as the readout row selection means and the readout column selection means in the aforesaid embodiments respectively, enabling random access for readout of each detecting cell 1.

Furthermore, in the above-described embodiments, the description has been made assuming that each of the source follower amplifier elements 13, the charge transfer switch elements 14, the bias switch elements 15, the reset switch elements 16, and the readout selection switch elements 17 constituting the detecting cells 1, and the column selection switch elements 18-1 and 18-2 is an n-channel MOS transistor (FET), but n-channel MOS transistors and p-channel MOS transistors may be used in combination for them.

Alternatively, the above described elements may be constituted only by p-channel MOS transistors. However, the polarity of a gate control signal of the p-channel MOS transistor is reversed to that of the n-channel MOS transistor.

EFFECT OF THE INVENTION

As has been described, the electrostatic capacitance detecting device according to the invention detects the projections and depressions of the object to be detected by difference in electrostatic capacitance without using an optical image pickup technology, so that it can be realized as a device in plane form on a semiconductor substrate. Accordingly, the use of this device enables realization of a small-sized, thin, lightweight fingerprint information input device, which can be mounted on a portable device.

Further, all the switch elements and amplifier elements constituting this electrostatic capacitance detecting device can be composed of MOS transistors (FETs), thereby enabling operation by a single power supply, resulting in lower power consumption than that in the case of using CCDs. Furthermore, this electrostatic capacitance detecting device does not require a light source, resulting in no consumption of electric power to cause the light source to emit light.

Moreover, the detection of accurate capacitance is possible without being affected by the charged condition of the object to be detected, enabling input of a high quality detection image.

Furthermore, charges are injected into the electrostatic capacitance element formed by the object to be detected and the detecting electrode, and the signal is detected in each cell, whereby making it possible to operate the electrostatic capacitance detecting device at a speed higher than that of detecting a signal by injecting charges into wiring for readout and its parasitic capacitance.

What is claimed is:

1. An electrostatic capacitance detecting device, comprising:
   a detecting electrode constituting an electrostatic capacitance by being brought into contact with or put close to an object to be detected through a protection film; a bias switch element for injecting bias charges into said detecting electrode; a charge transfer switch element for transferring signal charges accumulated in said detecting electrode in response to a timing signal for signal detection;
   a capacitance element for converting the signal charges transferred thereto via said charge transfer switch element into a voltage signal; a source follower amplifier element, for receiving and amplifying a holding voltage of said capacitance element; a readout selection switch element provided on a source side of said source follower amplifier element; and a reset switch element for providing said capacitance element with a reset potential, wherein said detecting electrode, said bias switch element, said charge transfer switch element, said capacitance element, said source follower amplifier element, said readout selection switch element, and said reset switch element are provided on a semiconductor substrate.

2. An electrostatic capacitance detecting device according to claim 1, wherein each of said bias switch element, said charge transfer switch element, said reset switch element, said source follower amplifier element, and said readout selection switch element is a MOS transistor.

3. An electrostatic capacitance detecting device, comprising:
   a detecting area constituted by arranging two-dimensionally a plurality of detecting cells each including a detecting electrode constituting an electrostatic capacitance by being brought into contact with or put close to an object to be detected through a protection film, a bias switch element for injecting bias charges into said detecting electrode, a charge transfer switch element for transferring signal charges accumulated in said detecting electrode in response to a timing signal for signal detection, a capacitance element for converting the signal charges transferred thereto via said charge transfer switch element into a voltage signal, a source follower amplifier element for receiving and amplifying a holding voltage of said capacitance element, a readout selection switch element provided on a source side of said source follower amplifier element, and a reset switch element for providing said capacitance element with a reset potential; readout row selection means for selecting a readout row in said detecting area; and readout column selection element for selecting a readout column in said detecting area, wherein said detecting area, said readout row selection means, and said readout column selection element are provided on a semiconductor substrate.

4. An electrostatic capacitance detecting device according to claim 3,
   wherein said readout row selection means is a first shift register for controlling said readout selection switch element of said each detecting cell for each readout row, and
   wherein said readout column selection element is composed of vertical signal lines for sending-out output signals from said readout selection switch elements of said detecting cells together for each readout column, a single detection signal output line, column selection switch elements provided between said vertical signal lines and said single detection signal output line respectively, and a second shift register for controlling said column selection switch elements.

5. An electrostatic capacitance detecting device according to claim 3, wherein each of said bias switch element, said charge transfer switch element, said reset switch element, said source follower amplifier element, and said readout selection switch element constituting said each detecting cell is a MOS transistor.

6. An electrostatic capacitance detecting device according to claim 4, wherein each of said bias switch element, said charge transfer switch element, said reset switch element, said source follower amplifier element, and said readout selection switch element constituting said each detecting cell, and said column selection switch element in said readout column selection means is a MOS transistor.

7. An electrostatic capacitance detecting device, comprising:
   a detecting electrode constituting an electrostatic capacitance element by being brought into contact with or put close to an object to be detected through a protection film; a bias switch element for injecting bias charges into said detecting electrode; a charge transfer switch element for transferring signal charges accumulated in said detecting electrode in response to a timing signal for signal detection; a capacitance element for converting the signal charges transferred thereto via said charge transfer switch element into a voltage signal; a source follower amplifier element for receiving and amplifying a holding voltage of said capacitance element; and a readout selection switch element provided on a source side of said source follower amplifier element, wherein said detecting electrode, said bias switch element, said charge transfer switch element, said capacitance element, said source follower amplifier element, and said readout selection switch element are provided on a semiconductor substrate.

8. An electrostatic capacitance detecting device according to claim 7, wherein each of said bias switch element, said charge transfer switch element, said source follower amplifier element, and said readout selection switch element is a MOS transistor.

9. An electrostatic capacitance detecting device, comprising:

a detecting area constituted by arranging two-dimensionally a plurality of detecting cells each including a detecting electrode constituting an electrostatic capacitance element by being brought into contact with or put close to an object to be detected through a protection film, a bias switch element for injecting bias charges into said detecting electrode, a charge transfer switch element for transferring signal charges accumulated in said detecting electrode in response to a timing signal for signal detection, a capacitance element for converting the signal charges transferred thereto via said charge transfer switch element into a voltage signal, a source follower amplifier element for receiving and amplifying a holding voltage of said capacitance element, and a readout selection switch element provided on a source side of said source follower amplifier element; readout row selection means for selecting a readout row in said detecting area; and readout column selection means for selecting readout column in said detecting area, wherein said detecting area, said readout row selection means, and said readout column selection means are provided on a semiconductor substrate.

10. An electrostatic capacitance detecting device according to claim 9, wherein said readout row selection means is a first shift register for controlling said readout selection switch element of said each detecting cell for each readout row, and wherein said readout column selection means is composed of vertical signal lines for sending-out output signals from said readout selection switch elements of said detecting cells together for each readout column, a single detection signal output line, column selection switch elements provided between said vertical signal lines and said single detection signal output line respectively, and a second shift register for controlling said column selection switch elements.

11. An electrostatic capacitance detecting device according to claim 9, wherein each of said bias switch element, said charge transfer switch element, said source follower amplifier element, and said readout selection switch element constituting said each detecting cell is a MOS transistor.

12. An electrostatic capacitance detecting device according to claim 10, wherein each of said bias switch element, said charge transfer switch element, said source follower amplifier element, and said readout selection switch element constituting said each detecting cell, and said column selection switch element in said readout column selection element is a MOS transistor.

13. An electrostatic capacitance detecting device, comprising: a detecting electrode constituting an electrostatic capacitance element by being brought into contact with or put close to an object to be detected through a protection film; a charge transfer switch element for transferring signal charges accumulated in said detecting electrode in response to a timing signal for signal detection; a capacitance element for converting the signal charges transferred thereto via said charge transfer switch element into a voltage signal; a source follower amplifier element for receiving and amplifying a holding voltage of said capacitance element; a readout selection switch element provided on a source side of said source follower amplifier element; and a reset switch element for providing said capacitance element with a reset potential, wherein said detecting electrode, said transfer switch element, said capacitance element, said source follower amplifier element said readout selection switch element, and said reset switch element are provided on a semiconductor substrate.

14. An electrostatic capacitance detecting device according to claim 13, wherein each of said charge transfer switch element, said reset switch element, said source follower amplifier element, and said readout selection switch element is a MOS transistor.

15. An electrostatic capacitance detecting device, comprising: a detecting area constituted by arranging two-dimensionally a plurality of detecting cells each including a detecting electrode constituting an electrostatic capacitance element by being brought into contact with or put close to an object to be detected through a protection film, a charge transfer switch element for transferring signal charges accumulated in said detecting electrode in response to a timing signal for signal detection, a capacitance element for converting the signal charges transferred thereto via said charge transfer switch element into a voltage signal, a source follower amplifier element for receiving and amplifying a holding voltage of said capacitance element, a readout selection switch element provided on a source side of said source follower amplifier element, and a reset switch element for providing said capacitance element with a reset potential; readout row selection means for selecting a readout row in said detecting area; and readout column selection means for selecting a readout column in said detecting area, wherein said detecting area, said readout row selection means, and said readout column selection means are provided on a semiconductor substrate.

16. An electrostatic capacitance detecting device according to claim 15, wherein said readout row selection means is a first shift register for controlling said readout selection switch element of said each detecting cell for each readout row, and wherein said readout column selection means is composed of vertical signal lines for sending-out output signals from said readout selection switch elements of said detecting cells together for each readout column, a single detection signal output line, column selection switch elements provided between said vertical signal lines and said single detection signal output line respectively, and a second shift register for controlling said column selection switch elements.

17. An electrostatic capacitance detecting device according to claim 15, wherein each of said charge transfer switch element, said reset switch element, said source follower amplifier element, and said readout selection switch element constituting said each detecting cell in is a MOS transistor.

18. An electrostatic capacitance detecting device according to claim 16, wherein each of said charge transfer switch element, said reset switch element, said source follower amplifier element, and said readout selection switch element constituting said each detecting cell, and said column selection switch elements in said readout column selection means are transistors.

* * * * *

UNITED STATES PATENT AND TRADEMARK OFFICE
CERTIFICATE OF CORRECTION

PATENT NO. : 6,448,790 B1
DATED : September 10, 2002
INVENTOR(S) : Toshio Imai

It is certified that error appears in the above-identified patent and that said Letters Patent is hereby corrected as shown below:

Column 17,
Line 3, change "cell in is" to be -- cell is --

Signed and Sealed this

Twenty-fifth Day of February, 2003

JAMES E. ROGAN
*Director of the United States Patent and Trademark Office*